United States Patent [19]

Ward et al.

[11] 4,033,606
[45] July 5, 1977

[54] VEHICLE TANDEM SUSPENSIONS

[75] Inventors: James C. Ward, Springfield; Robert Wayne Davis, Ozark, both of Mo.

[73] Assignee: Reyco Industries, Inc., Springfield, Mo.

[22] Filed: Aug. 6, 1975

[21] Appl. No.: 602,218

[52] U.S. Cl. ............................ 280/682; 267/56; 280/686

[51] Int. Cl.² ............................ B60G 11/10

[58] Field of Search .......... 280/682, 686, 680, 676; 267/54 R, 36 A, 46, 47, 56

[56] References Cited

UNITED STATES PATENTS

| | | | |
|---|---|---|---|
| 2,719,728 | 10/1955 | Boyles | 280/682 |
| 3,024,038 | 3/1962 | Butler | 280/682 |
| 3,510,149 | 5/1970 | Raidel | 267/54 R |
| 3,614,123 | 10/1971 | Raidel | 280/686 |
| 3,625,538 | 12/1971 | Raidel | 280/686 |
| 3,799,562 | 3/1974 | Hinchliff | 280/682 |
| 3,833,236 | 9/1974 | Davis | 280/682 |
| 3,841,652 | 10/1974 | Higginson | 280/682 |

Primary Examiner—Joseph F. Peters, Jr.
Assistant Examiner—John A. Carroll
Attorney, Agent, or Firm—Kinzer, Plyer, Dorn & McEachran

[57] ABSTRACT

An equalized suspension system is provided for the truck of a truck-trailer combination of the tandem axle type. The suspension on each side of the vehicle includes independent semi-elliptic leaf springs mounted in tandem relationship one behind the other, and which are respectively connected at their midpoint to the forward and rearward axles. The remote ends of each spring are supported in rolling contact with respective roller assemblies housed by respective brackets which, in turn, are secured to the frame of the truck. An equalizer support bracket is provided between the adjacent ends of each pair of springs and an equalizer is pivotally supported within each equalizer support bracket. The adjacent ends of the springs are pivotally attached to shackles which, in turn, are pivotally mounted to the respective equalizers.

11 Claims, 9 Drawing Figures

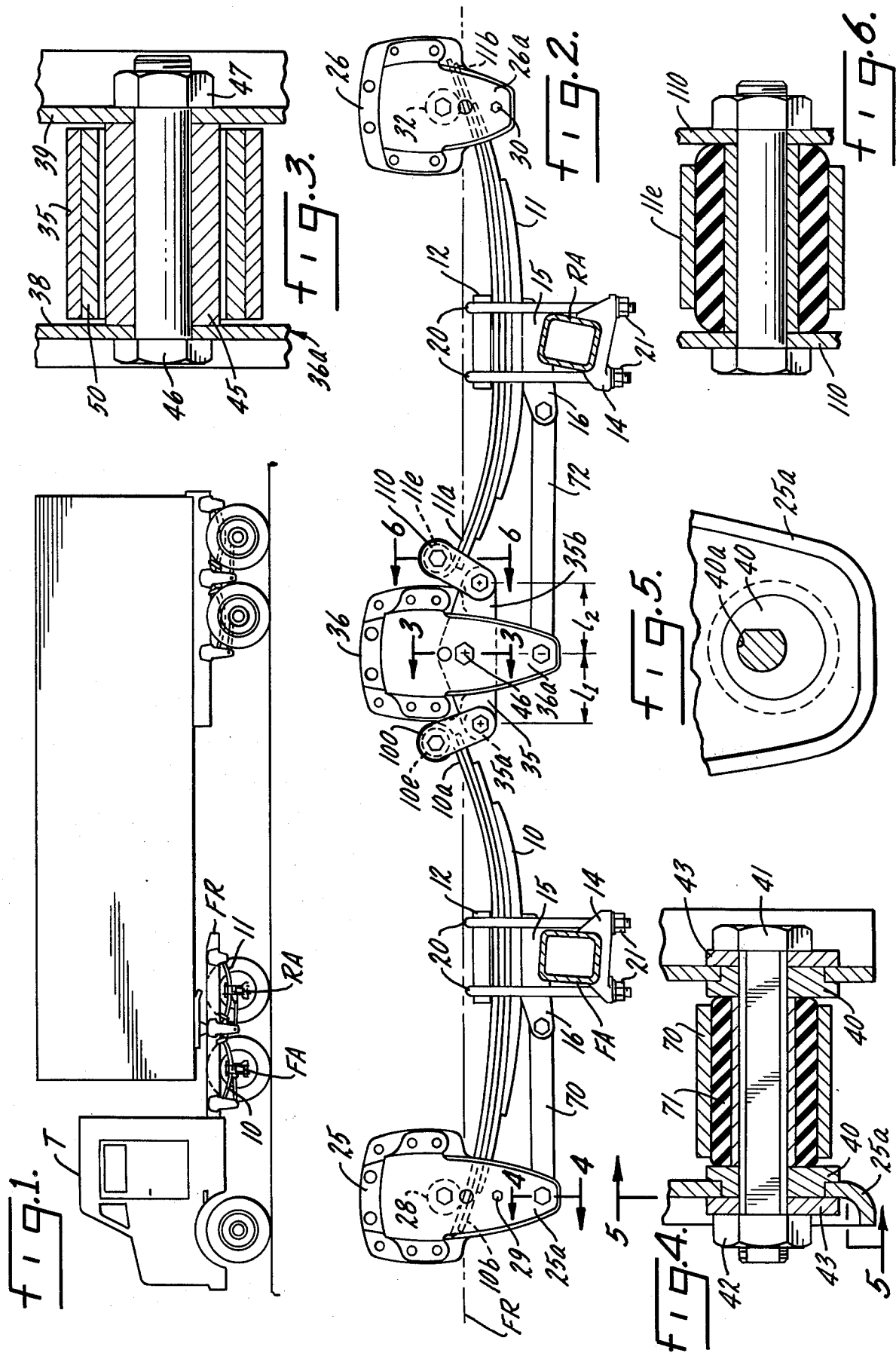

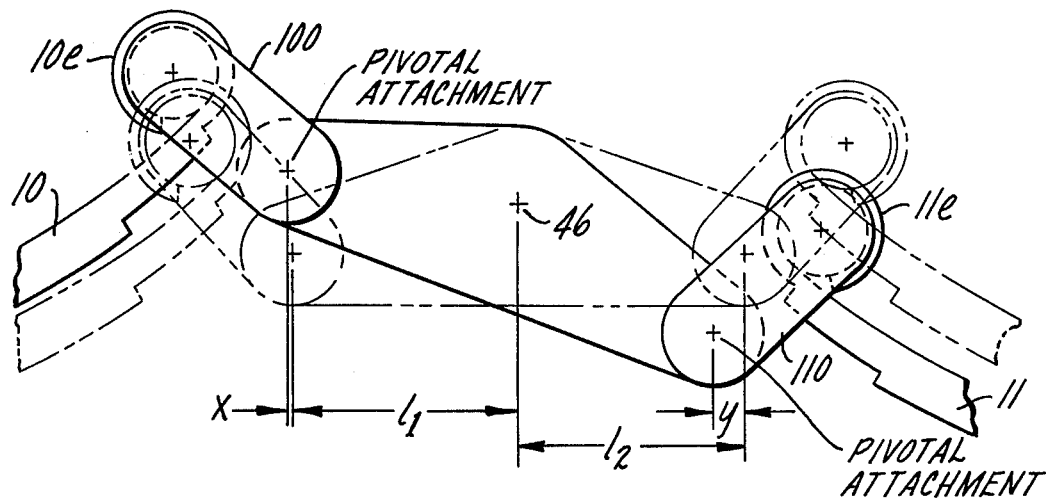
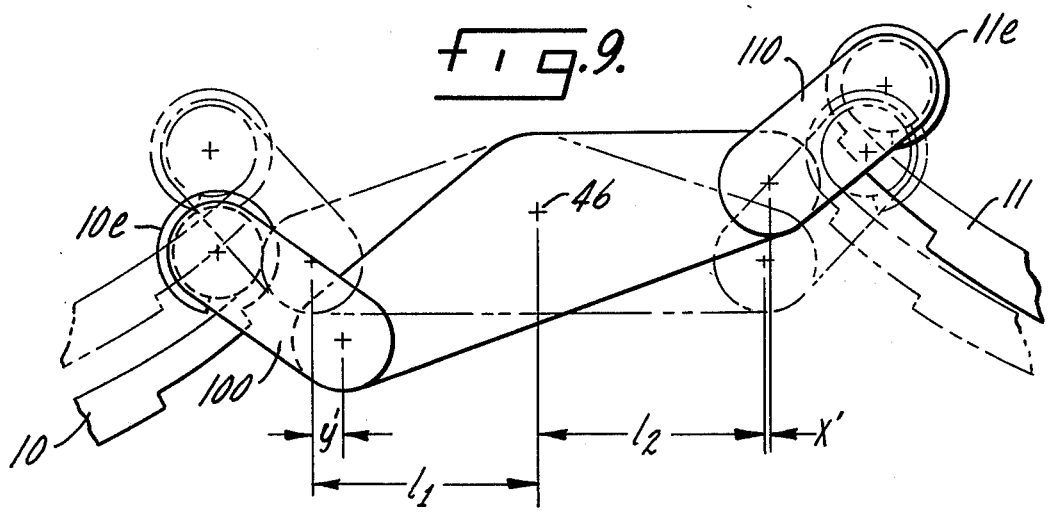
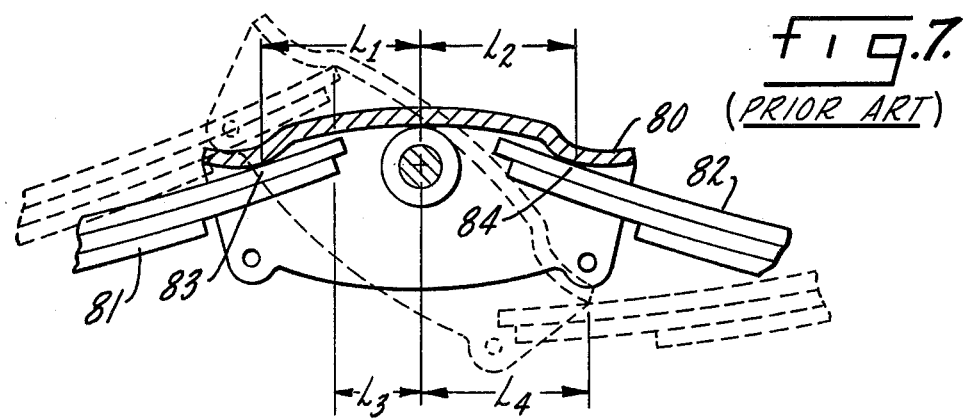

VEHICLE TANDEM SUSPENSIONS

BACKGROUND OF THE INVENTION

This invention relates to suspension systems and in particular to a tandem axle suspension.

Conventional tandem axle assemblies for trucks or trailers are constructed with four leaf springs, two on each side of the frame. The remote ends of each pair of springs are usually supported in sliding contact with a fixed bearing surface, within suitable hanger brackets which are secured to the frame. The adjacent ends of each pair of springs are supported in sliding contact with fixed bearing surfaces within a pivotally mounted equalizer of one type or another. The equalizers are in turn supported by suitable hanger brackets which are secured to the frame.

Thus, the consequence of the arrangement for the equalized suspension described above is that if the front wheels in the tandem suspension, for example, should encounter a condition in the road producing a severe vertical movement of the front axle, the resultant deflection in the front springs will be transmitted in part by the equalizer to the rear springs. This results in an equalizing effect of the applied loads on the roadway for a tandem axle vehicle in which any abnormal vertical displacement of either axle, in the negative or positive sense, is distributed between the springs so as to minimize the weight differential between the axles. It can be appreciated, therefore, that the greater the equalizing capability of a tandem axle suspension, the less the chance of damage to the lading, roadway, pavement or bridge structure due to concentrated loading of either axle.

In the instance of a vehicle equipped with a prior art equalization tandem of the general type described above one problem that has been encountered, and is common to tandem axle suspensions with similar equalizing mechanisms, is that of inadequate load equalization from one axle to another. This condition occurs primarily as a result of the development of greatly unequal moments about the center pivot points of the equalizing mechanism when in operation. More specifically this is due to the attitude of the integral or fixed equalizer bearing pads relative to the spring ends as equalizer rotation occurs. As one end of the equalizer rotates upwardly the point at which the spring end contacts the integral bearing pad moves in the inboard direction. Concurrently the opposite end of the equalizer moves downwardly and the point at which its respective spring end contacts its integral bearing pad moves in the outboard direction. This action causes unequal moments about the center pivot point of the equalizer; inequality increases as the arc of equalizer movement increases.

Another contributing factor to the problem of inadequate load distribution is friction within the suspension. One major source of this friction is the contact of the outer or remote spring ends with the fixed bearing surfaces. As the spring is loaded the elongation or extension laterally due to the flattening of the cambered leaves necessitates spring movement relative to the bearing pad. In order for this relative movement (and ultimately equalization) to occur a force must be introduced of a magnitude sufficient to overcome static friction and allow this relative movement. If, for example, the wheels of an axle encounter a bump which produces a vertical force below the minimum necessary to overcome the static or break-away friction within that particular unit no relative movement occurs between the spring ends and the known bearing pads and, thusly, no load equalization.

Working concurrently these two factors cause inadequate load distribution throughout the full range of bumps and chuck holes which a tandem suspension might encounter in service. As bumps of small magnitude are encountered such as concrete highway expansion joints, the resultant force is often inadequate to overcome friction and momentary unequal load distribution occurs. As bumps of greater magnitude are encountered and resultant forces are adequate to overcome friction the unequal moments about the center pivot points of the equalizing mechanisms come into play, hindering proper load equalization.

The end results of improper load equalization, whether momentary or sustained, are many fold. If the axle which encounters bumps and overloads is of the unpowered type a resultant loss of traction occurs on the powered vehicle. The suspension components, and springs in particular, are subjected to higher stresses and therefore their service life is shortened appreciably. As the springs are subjected to overload, being of the progressive deflection-rate type, they progressively lose capacity to absorb energy and therefore transmit more energy through the mounting brackets to the vehicle frame and adversely affect the ride quality of the vehicle. This increased input of energy into the vehicle frame can often contribute, at given loads, speeds, highway conditions, etc., to resonant harmonic conditions which manifest themselves as vibrations of varying frequencies and amplitudes. These conditions are injurious to the vehicle and indeed are a source of driver fatigue, discomfort and injury. A final consideration is that, wherever an unequal load distribution occurs within a tandem suspension, the axle which is overloaded transmits its load to the roadway which is detrimental to the roadway, particularly in the case of shallow based asphalt roads or new unsettled highway pavement.

The suspension system of the present invention includes pivotally mounted shackles interposed between the adjacent ends of the leaf springs and the equalizer beam ends which support the adjacent ends of the leaf springs. As equalizer rotation occurs, although the spring ends and shackles change in attitude relative to the equalizer beams, the points at which they transmit their load to the equalizer beams remain substantially equal inasmuch as they are defined by the arcuate path on which they travel about the center pivot of the equalizer mechanism during equalizer rotation. Consequently, the moments about the center pivot points of the equalizer mechanism remain much more nearly equal, resulting in more even distribution of load from one axle of the tandem to the other. Further, the remote end of each of the four springs is mounted upon and supported by a low friction roller which virtually eliminates the friction associated with the prior practice of establishing sliding contact between the spring ends and hanger bearing surfaces. With the use of pivotally mounted shackles on the adjacent spring ends and low-friction rollers on the remote spring ends friction is greatly reduced allowing the equalizing mechanism of the tandem to function properly upon the introduction of correspondingly reduced force magnitudes. Further, the use of pivotally mounted shackles on the adjacent spring ends and low-friction rollers on the remote spring ends eliminates the wear to both springs and bearing surfaces of the type normally associated with suspensions of the prior art.

BRIEF DESCRIPTION OF THE DRAWINGS

FIG. 1 is a somewhat schematic view of a truck-trailer combination having a tandem axle truck equalizing suspension incorporating the concepts of the present invention;

FIG. 2 is a partly broken-away side elevation of a suspension assembly constructed in accordance with one embodiment of the invention;

FIG. 3 is a sectional view taken substantially on line 3—3 of FIG. 2;

FIG. 4 is a partial section view taken substantially on line 4—4 of FIG. 2;

FIG. 5 is detail view taken substantially on line 5—5 of FIG. 4.

FIG. 6 is a sectional view taken substantially on line 6—6 of FIG. 2.

FIG. 7 is a showing of the arrangement prevailing in a standard equalizer; and

FIGS. 8 and 9 show several dynamic conditions of the equalizer under the invention.

DETAILED DESCRIPTION OF THE ILLUSTRATED EMBODIMENT

In FIG. 1 there is illustrated a tandem axle vehicle in the form of a truck T having a rear suspension of front and rear axles FA and RA supporting the related wheels, axle FA being of the driven type and axle RA being of either the driven or undriven type. In order to preserve the cargo, and to prevent damage to the vehicle and roadway, the axles FA and RA are associated with an improved suspension of the semi-elliptic leaf spring type, the details of which are illustrated in FIG. 2.

It should be noted that the representation of FIG. 2 is the rear suspension system of one side of the truck and that a similar suspension system is also mounted on the other side of the truck. As mentioned above, the suspension system as shown in FIG. 2 includes springs of the elongated type, and specifically a semi-elliptic forward compound leaf spring 10, and a semi-elliptic rear compound leaf spring 11. As shown in FIGS. 1 and 2 the leaf springs 10 and 11 are independent of one another, and are arranged in a tandem relationship one behind the other, so that the springs have inner ends 10a and 11a disposed adjacent to one another, and outer ends 10b and 11b remote from one another.

The semi-elliptic compound leaf springs 10 and 11 are connected at substantially their midpoints respectively to the front and rear axles FA and RA of the truck. The connections are similar for both the front and rear springs, and include a top plate 12 configured complemental to the mid-section of the corresponding spring stack. The bottom of the spring stack in each instance rests on an axle seat 15 having an upper face contour complemental to the lower-most spring leaf and with the lower face thereof shaped complemental to the counter of the axle FA or RA to embrace the same. An arm 16 extends forwardly from and depends below each axle seat 15. Each arm 16 is made integral with the related axle seat 15. A bottom plate 14 is provided with the upper face thereof shaped complemental to the contour of the axle FA or RA to embrace the same.

It will be seen that each of the semi-elliptic compound leaf springs 10 and 11 is embraced at the midpoint thereof by the top plates 12 and axle seats 15. These enable the springs to be firmly joined independently to each related axle. To this end, U-bolts 20 are disposed with the bight portions thereof around the upper face of the top plates 12, and with the legs thereof projected through receiving sockets provided therefor in the bottom plates 14. The threaded ends of the U-bolts 20 project downwardly beyond the bottom plates 14, and self-locking nuts 21 are threaded tightly thereon to the extent that each spring is rigidly joined to the related axle so that any movement of that axle is accompanied by movement of its associated spring.

The front end 10b of each front spring 10 is arranged to react against the frame of the truck in the event the spring 10 is flexed by an upwardly applied force produced from a bump encountered by the axle FA, and the rear end 11b of each rear spring 11 is arranged to react against the frame of the truck in the event that the spring 11 is flexed by an upwardly applied force produced from a bump encountered by the axle RA. However, the rear end 10a of each front spring 10 and the front end 11a of each rear spring 11 are mutually equalized to enable loads to be distributed back and forth between the springs and axle 10 and FA and the springs and axle 11 and RA, in a manner to be described.

A front spring bracket 25 and a rear spring bracket 26 are secured to the frame FR at locations corresponding to the remote ends 10b and 11b of the springs 10 and 11. The brackets 25 and 26 include downwardly extending leg portions 25a and 26a respectively. The front bracket 25 is provided with a permanently mounted cylindrical roller 28 which is engaged tangentially by the front end 10b of the front spring 10. In this manner the front end of the front spring is supported for rolling friction.

The leg 25a of the bracket 25 is in reality a hollow housing, and the front end 10b of the front spring 10 extends into this housing to engage the cylindrical roller 28. The roller 28 enables the front spring 10 to effectively bear against the frame FR when supporting the load of the vehicle. A retainer 29 is arranged within the depending housing 25a of the bracket 25 beneath the front end 10b of the front spring 10 to prevent the spring from being dislocated from the bracket.

The rear end 11b of the rear spring 11 is supported for rolling friction in a similar manner in the bracket 26. Specifically the rear end 11b of the rear spring 11 extends into the housing 26a of bracket 26 to engage a cylindrical roller 32 and effectively bear against the frame FR when supporting the load of the vehicle. A retainer 30 is arranged beneath the rear end 11b of the rear spring 11 to prevent the spring from being dislocated from the bracket.

As noted above, the adjacent ends 10a and 11a of the springs 10 and 11 are mutually equalized and, for that purpose, the suspension includes at each side of the vehicle an equalizer support bracket 36 rigidly affixed to the frame FR, as are the brackets 25 and 26. The housing portion 36a of bracket 36, as shown in detail in FIG. 3, has spaced sides 38 and 39. The equalizer beam 35 is accommodated between the sides 38 and 39 for pivotal movement within the bracket. The equalizer beam 35 has forwardly and rearwardly extending arm portions 35a and 35b which extend from opposite sides of the bracket.

The aperture in the equalizer 35 is of relatively large size and is arranged to be disposed concentrically about a horizontal support shaft 45, as shown in FIG. 3, which has its ends disposed between the opposite side walls 38 and 39 of the support bracket 36. The support shaft 45 is secured within the bracket against rotation by the clamping force of bolt 46 and nut 47. The equalizer 35 is supported pivotally upon the shaft 45, and a bearing member including a bushing 50 is interposed between the equalizer 35 and the shaft 45. The bushing permits rocking or rotating action of the equalizer about the shaft.

The equalizer arms 35a and 35b project from the forward and rear sides of the pivotal support shaft 45. The rear end 10a of the front spring 10 is pivotally attached to and supported by a shackle 100, which in turn is pivotally supported on the end of arm 35a of the equalizer 35. The spring end 10a is provided with an eye 10e and attached pivotally thereby to the shackle by means, for example, of a bushing and shaft somewhat similar to that described in conjunction with the bracket 36 and equalizer 35, as shown in FIG. 6.

The front end 11a of the rear spring 11 has an eye 11e similarly attached, through a shackle 110, to the end of arm 35b of the equalizer 35.

As shown in FIG. 2, the depending leg 25a of the front bracket 25 extends well below the retainer 29, and a front torque rod 70 is connected at the front end thereto and extends rearwardly to be connected to the lower end of the arm 16 which is associated with the front axle seat 15.

A rear torque rod 72 extends in similar fashion from the lower end of bracket 36, to which it is connected, to the arm 16 of the rear axle seat 15 to which it is connected. Torque rods 70 and 72 on both sides of the vehicle are of one-piece construction.

FIGS. 4 and 5 depict an arrangement for the purpose of aligning the axles FA and RA. FIGS. 4 and 5 show a bushing 40 inserted in each leg of portion 25a of the bracket 25. Each bushing 40 is provided with an aperture 40a, eccentrically located. The aperture is configured with a flat on its circumference, FIG. 5. The body of bolt 41 is similarly shaped so that, when bushings 40 are inserted in their mounting openings in the legs of bracket 25 and bolt 41 is inserted through bushings 40, any rotational movement of the bolt 41 is accompanied by like rotational movement of the bushings 40 within the openings provided in the legs of bracket 25. Due to the eccentrically located aperture 40a this results in a displacement, forward or rearward, of the bolt center in relation to the legs of bracket 25.

Thus, when the front end of the front torque rod 70 is installed on bolt 41 as shown in FIGS. 2 and 5 and the opposite end affixed within arms 16 of the front axle seat 15 and the above described rotational movement applied to bolt 41, a resultant dislocation of axle FA occurs relative to bracket 25, either forward or rearward as necessary for axle alignment. When the axle is properly positioned the entire assembly is rigidly clamped upon the torque rod bushing sleeve 71 by the bolt 41 and nut 42 by use of compression washers 43.

Alignment of the rear axle RA is accomplished by a similar mechanism within portion 36a of bracket 36 and its associated torque rod 72 affixed within arm 16 of rear axle seat 15.

A typical equalizer beam 80 of known form is shown in FIG. 7, typical, for example, of the equalizer beam of U.S. Pat. No. 2,841,414. In the static condition the lever arms $L_1$ and $L_2$ are of equal length. A severe dynamic condition is shown in FIG. 7, where the equalizer 80 has pivoted clockwise to the position shown in dashed line due to severe loading on the front spring 81. In the ideal condition, the load should be equally distributed between the front spring and the rear spring 82 but since the adjacent ends of the springs slidably engage the equalizer arms at tangent points 83 and 84 the effective lever arms, in the dynamic or tilted state, are considerably shortened to $L_3$ at one side of the equalizer and cosiderably lengthened to $L_4$ at the other side. Because of the radical alteration in the effective length of lever arms during severe equalizer movement, the load is far from the ideal state of equalization. Specifically, there is an appreciable mechanical disadvantage at the front spring ($L_3 < L_1$) and a slight mechanical advantage at the rear spring where $L_4 > L_2$.

Two different positions for the equalizer of the present tandem suspension are shown in FIGS. 8 and 9. In each of these figures, the static or idle position of the equalizer is shown in dashed line, with the lever arms shown as $l_1$ and $l_2$. As the equalizer pivots clockwise, FIG. 8, due to a sudden load impressed on the front axle because of the road surface, there is only a slight change in the length of the lever arms: $l_1$ lengthens slightly by an amount $x$ and $l_2$ shortens slightly by an amount $y$. When the equalizer pivots in the opposite direction, FIG. 9, the reverse occurs: arm $l_2$ lengthens by an amount $x'$, arm $l_1$ shortens by an amount $y'$.

Since the adjacent inner ends of the springs are respectively shackled to the opposed ends of the equalizer beams, the inner end of each spring is displaced from related end of the equalizer, unlike the prior art where the spring bears on the equalizer. This distance is represented by the distance between the pivotal centers of each shackle, and is fixed and invariant regardless of the attitude of the equalizer.

Nonetheless, the shackles constitute flexible or articulated connections between the springs and the free end of the related equalizer arm, so that each spring is able to flex both in extension and contraction; the angle or attitude of the shackle link changes to allow free play of the spring. In this connection, the roller engaged by the outer ends of the springs establish rolling friction and also assure quick response of the springs in absorbing loads, contributing materially to greater comfort of the driver.

In the specific embodiment shown, the points of articulated attachment to the equalizer arms are displaced to lie below the pivotal axis (46) of the equalizer. This accounts for a slight mechanical advantage of the lever arm ($l_1 + x$, FIG. 8) associated with the spring (axle) which is loaded, and may be relied on, for example, to compensate for frictional resistance in the equalizer. However, such displacement is not essential.

The suspension has been shown as installed on the tandem axles of a truck or tractor. It may equally well be applied to the tandem axles of the trailer as shown in FIG. 1. Also the torque rod connections shown herein may be altered to preclude axle hop as disclosed in the Ward U.S. Pat. No. 2,841,414.

It may be observed that in our U.S. Pat. No. 3,833,236 the inner ends of the springs are in sliding contact with pivotal bearing pads and are not constrained by a shackle or other articulated connection in order to maintain a fixed displacement from the end of the spring in accordance with the present invention.

We claim:

1. In a suspension for a vehicle having forward and rearward axles in tandem relation beneath the frame thereof, first and second elongated semi-elliptic compound leaf springs mounted in tandem one behind the other on each side of the vehicle and independent of one another, means coupling the medial portions of each of the said springs to the axles so that the springs at each side of the vehicle have inner ends disposed adjacent to one another and outer ends spaced remotely from one another; means slidably supporting the outer ends of the respective springs on the frame of the vehicle to react against the frame of the vehicle in the event a corresponding spring is flexed upwardly by an upwardly applied force encountered by the corresponding axle; an equalizer support member secured to the frame of the vehicle between the adjacent ends of the first and second spring, an equalizer beam pivotally mounted on said equalizer support member; a first shackle assembly pivotally attached to the forward end of said equalizer and pivotally attached to the inner end of said first spring; a second shackle assembly pivotally attached to the rearward end of said equalizer and pivotally attached to the inner end of said second spring, so that an encountered force exerted on one axle deflecting the associated spring is transmitted directly through its associated shackle to the equalizer beam, in turn, through the second shackle which imposes a portion of the encountered force on the spring associated therewith; and front and rear torque rods beneath the related springs and each having a rear end connected to the related axle with the opposite front end connected to a part secured to the frame of the vehicle, said opposite ends of the torque rod being so connected to be positioned at points lying below a line joining the slidable supports for the springs.

2. The suspension defined in claim 1, which includes roller assemblies supported by the vehicle frame in turn engaged respectively by the outer ends of the two springs.

3. The suspension defined in claim 1, in which the front and rear torque rods are so connected as to be substantially horizontal.

4. The suspension defined in claim 1 in which each shackle is connected to the equalizer at a point displaced below the pivotal center of the equalizer.

5. The suspension defined in claim 3 including front and rear brackets attached dependently to the frame of the vehicle adjacent the outer ends of the springs, said front torque rods being connected to said front brackets, and rollers supported by each of said brackets in turn engaged by the outer ends of the springs.

6. The suspension defined by claim 5 wherein the front and rear torque rods are so connected as to be substantially horizontal.

7. In a suspension for a vehicle having forward and rearward axles in tandem, first and second elongated leaf springs mounted in tandem one behind the other on each side of the vehicle, means coupling the medial portions of each of said springs to the axles so that the springs at each side of the vehicle have inner ends disposed adjacent to one another and outer ends spaced remotely from one another; means slidably supporting the outer ends of the respective springs on the frame of the vehicle to react against the frame of the vehicle; an equalizer beam having opposed arms and being pivotally supported on the frame of the vehicle for distributing part of a load impressed on one spring to the other spring; the inner end of each spring being displaced a predetermined distance from the free end of the related equalizer arm, and link means articulating the inner end of each spring to the free end of the related equalizer arm, said articulating link means constraining the inner ends of the springs to maintain said displacement during movement of the equalizer and front and rear torque rods beneath the related springs and each having a rear end connected to the related axle with the opposite front end connected to a part secured to the frame of the vehicle, said opposite ends of the torque rod being so connected to be positioned at points lying below a line joining the slidable supports for the springs.

8. The suspension defined in claim 7, which includes roller assemblies supported by the vehicle frame in turn slidably engaged respectively by the outer ends of the two springs.

9. The suspension defined in claim 7 in which each of the articulating means is connected to the related equalizer arm at a point displaced from the pivotal center of the equalizer beam.

10. The suspension defined in claim 9 including brackets attached to the frame of the vehicle adjacent the outer ends of the springs, said front torque rods being connected to said front brackets, and rollers supported by said brackets in turn slidably engaged by the outer ends of the springs.

11. The suspension defined by claim 10 wherein the front and rear torque rods are so connected as to be substantially horizontal.

* * * * *